(12) United States Patent
Steenstrup et al.

(10) Patent No.: US 7,970,641 B2
(45) Date of Patent: Jun. 28, 2011

(54) AUTOMATED BUNDLE PACKAGE PRICING

(75) Inventors: Dan Steenstrup, Chicago, IL (US); Colleen Wright, Chicago Heights, IL (US); Marion Miljevic, Chicago, IL (US); Peter Wigren, Chicago, IL (US)

(73) Assignee: Freeman Capital Company, Las Vegas, NV (US)

( * ) Notice: Subject to any disclaimer, the term of this patent is extended or adjusted under 35 U.S.C. 154(b) by 57 days.

(21) Appl. No.: 12/434,273

(22) Filed: May 1, 2009

(65) Prior Publication Data

US 2010/0280974 A1 Nov. 4, 2010

(51) Int. Cl.
G06Q 10/00 (2006.01)
G06Q 30/00 (2006.01)
G01G 19/413 (2006.01)
G06F 17/00 (2006.01)

(52) U.S. Cl. .................................. 705/7.35; 705/414
(58) Field of Classification Search .................. None
See application file for complete search history.

(56) References Cited

U.S. PATENT DOCUMENTS

| | | | |
|---|---|---|---|
| 5,664,110 A | 9/1997 | Green et al. | |
| 5,910,896 A | 6/1999 | Hahn-Carlson | |
| 6,058,373 A | 5/2000 | Blinn et al. | |
| 6,557,007 B1 | 4/2003 | Pekowski et al. | |
| 6,721,763 B1 | 4/2004 | Pekowski et al. | |
| 2002/0095347 A1 | 7/2002 | Cummiskey | |
| 2003/0200111 A1 | 10/2003 | Damji | |
| 2004/0260615 A1 | 12/2004 | Phillips et al. | |
| 2007/0130064 A1* | 6/2007 | Strauss | 705/39 |
| 2007/0130086 A1* | 6/2007 | Chao et al. | 705/75 |
| 2007/0179862 A1 | 8/2007 | Armstrong et al. | |

OTHER PUBLICATIONS

FedEx Retail Counter Rates Book, effective Jan. 7, 2008.*
Maryland Association of realtors 2008 annual conference and Tradeshow Application for Exhibit Space, 2008.*
TooBase Services, http://web.archive.org/web/20060923041437/ http://www.tool...el4FAQ.aspx?ContentDetailID=1442 &BucketID=2&CategoryID=15, Jun. 9, 2006, retrieved Sep. 15, 2010.*
ALA mid winter meeting frequently asked questions, 2008, http://exhibitors.ala.org/MW08/manual/faq/glossary.html (1 of 21) retrieved Sep. 16, 2010.*
American Freight Companies 1999; http://web.archive.org/web/19991127133123/www.freightcenter.com/quickquotes.htm; Oct. 8, 1999; pp. 1-4.

(Continued)

Primary Examiner — John W Hayes
Assistant Examiner — George Chen
(74) Attorney, Agent, or Firm — Faegre & Benson LLP

(57) ABSTRACT

An automated system and method for pricing a bundle package based on a weight of a bundle includes an interface, a point of entry and a processor. The interface requests information and displays information. Data relating to the requested information is submitted through the point of entry. The requested information includes dimensions of a booth and a weight of a bundle to be displayed within the booth. The processor receives and controls the data and includes a rules database, a transaction processing system and a calculator. The rules database stores a pre-established set of rules for classifying data into one of a plurality of bundle packages and for associating the bundle packages with a price. The transaction processing system stores and analyzes the submitted data and the pre-established set of rules in the rules database. The calculator determines a bundle package price based on the submitted data and the pre-established rules in the rules database.

19 Claims, 3 Drawing Sheets

OTHER PUBLICATIONS

American Freight Companies 2001; http://web.archive.org/web/20010408045455/quote.freight-companies.com/quote.asp?id=20; Jan. 18, 2001; pp. 1-3.

American Freight Companies; http://web.archive.org/web/20061102150904/www.FreightCenter.com/go2/rates.htm; Apr. 27, 2006.

"An Advance Look at EXPO!EXPO! Exhibitors", IAEM Annual Meeting Preview, Tradeshow Week, Nov. 3, 1997, 2 pages.

Best Buy Product Finder; http://www.igodigital.com//bestbuy/camcorders.aspx; Jan. 11, 2006; 8 pages.

Ordonez, Brenda, "Cutting-Edge Contractors, How Industry Suppliers Use Technology to Control Costs", EXPO Special Section: Internet Showcase, http://www.expoweb.com, 3 pages.

"Visual Brand Exploration: Patagonia," Product information page from Jenkins & Page, www.jenkinspage.com/orig-art/portfolio_5-16.swf, 1 pg., undated.

Letters entitled "Patent Wars" by Ray Pekowski, "Education Justification" by Alyssa M. Rosinski, and "Space Race Off Base" by Julia O'Connor, printed in *MeetingNews*, Sep. 15, 2003, www.meetingnews.com, 1 page.

Pekowski, Ray, Patents: A Family Heritage, *Exposure*, The Expo Group newsletter, 4th Quarter 2003, vol. 9, No. 4, 2 pages.

The Expo Group Expands Patent Portfolio, Offers Licensing, Press Release, The Expo Group, Apr. 16, 2004.

"Your Survival Tool for the New Millenium", brochure by TheExpoGroup, 1 page.

Tufel, Gary, "Expo Group Fires Another Warning Shot on Patent", Press Release from Tradeshow Week, May 3, 2004, 1 page.

Krantz, Marshall, Article in MeetingNews.com, Wednesday, Oct. 15, 2003, 4 pages.

Genoist, Heidi, "Patent Wars, Episode II, Who Invented one-Stop Shopping?", Tradeshow Week, Jul. 28, 2003.

VanderZanden, Vanessa, "PMMI to Oust General Contractor, Run Show Itself", Tradeshow Week, Jul. 28, 2003.

Winn, Melissa, "Service Contractors Issue Statement Denying Exclusivity of TEG Patent", Tradeshow Week, Jul. 28, 2003.

Guided Sell Development Document, Apr. 1, 2005, The Freeman Companies FOL Phase II, 14 pages.

Material Handling Calculator, Oct. 27, 2004, FreemanOnline® Phase 2—Design, 5 pages.

"PMMI Creates Exhibitor Services company" Press Release, Arlington, VA Jul. 7, 2003, 2 pages, accessed at http://web.archive.org/web/20031210111004/www.pmmi.org/a/articledetail.asp?type=5&year=2003&dl_data=1054.

\* cited by examiner

| | | | |
|---|---|---|---|
| LITE | BUNDLE 1 | 0-3<br>$4.60 | • Drayage:machinery and display in/out<br>• Custom-cut carpet with plastic protective cover<br>• Nightly vacuuming<br>• Classic furniture group<br>• Empty removal and storage |
| | BUNDLE 2 | 3.1-6<br>$5.60 | |
| MEDIUM | BUNDLE 3 | 6.1-10<br>$5.45 | • Drayage: machinery and display in/out<br>• Rigging labor<br>• Nightly vacuuming<br>• Fork lifts and cranes<br>• Empty removal and storage<br>• One time spotting |
| | BUNDLE 4 | 10.1-22<br>$7.30 | Options:<br>• Custom-cut carpet available at $.75/ft², a 60% discount<br>• Unlimited classic furniture available at $2.05 per square foot |
| HEAVY | BUNDLE 5 | 22.1-35<br>$11.65 | • Drayage:machinery and display in/out<br>• Rigging labor<br>• Nightly vacuuming<br>• Fork lifts and cranes<br>• Empty removal and storage<br>• One time spotting |
| | BUNDLE 6 | 35.1-55<br>$15.35 | |
| | BUNDLE 7 | 55+<br>$23.25 | Options:<br>• Custom-cut carpet available at $.75/ft², a 60% discount<br>• Unlimited classic furniture available at $2.05 per square foot |

AUTOMATED BUNDLE PACKAGE PRICING

TECHNICAL FIELD

The present invention is related to the field of bundle package pricing. In particular, the present invention is related to an automated system and method for determining bundle package pricing based on booth dimensions, bundle weight and a set of pre-established rules.

BACKGROUND

Trade shows provide an opportunity for suppliers to present their products and/or services to a large group of potential customers at a single location. To convey company information to potential customers, the suppliers conventionally set up a booth to present useful information and/or displays. Because the booth may be the first and only introduction a supplier has to the potential customer base, a great deal of time and effort is typically put into the presentation of the booth. A general consideration that is evaluated in setting up the booth includes the theme the supplier wishes to convey. The theme can be expressed by the type of carpeting, furniture, accessories and colors the supplier uses in the booth.

Booth set-up can involve contacting various vendors specializing in different areas, such as carpeting, furniture, cleaning, etc. Oftentimes the supplier must contact several individual vendors to find an appropriate product or service at an acceptable price. The supplier then works individually with each vendor to receive and pay for each product or service. This can become a time-consuming and complex process in which a particular product or service may be overlooked. In addition, it may be difficult for a vendor to provide a cost scenario to the supplier at the time of ordering. For budgeting purposes, it would be advantageous for the supplier to have an estimation of costs.

SUMMARY

In one embodiment, the present invention is an automated system for pricing a bundle package based on a weight of a bundle and includes an interface, a point of entry and a processor. The interface requests information and displays information. Data relating to the requested information is submitted through the point of entry. The requested information includes dimensions of a booth and a weight of a bundle to be displayed within the booth. The processor receives and controls the data and includes a rules database, a transaction processing system and a calculator. The rules database stores a pre-established set of rules for classifying data into one of a plurality of bundle packages and for associating the bundle packages with a price. The transaction processing system stores and analyzes the submitted data and the pre-established set of rules in the rules database. The calculator determines a bundle package price based on the submitted data and the pre-established rules in the rules database.

In another embodiment, the present invention is a processor for pricing a bundle package based on a weight of a bundle. The processor includes a rules database, a transaction processing system and a calculator. The rules database stores a pre-established set of rules for classifying data into one of a plurality of bundle packages and for associating the bundle packages with a price. The transaction processing system stores and analyzes the submitted data and the pre-established set of rules in the rules database. The calculator determines a bundle package price based on the submitted data and the pre-established rules in the rules database.

In another embodiment, the present invention is an automated process for processing data related to bundle package pricing. The process includes requesting booth dimension information from a user, requesting weight information of to be shipped to the booth, determining a bundle package based on the requested information and a set of pre-established rules, and associating a price with the bundle package.

In yet another embodiment, the present invention is an automated method for calculating a bundle package pricing for a booth. The method includes inputting information relating to dimensions of the booth, inputting weight information relating to items and materials to be housed within the dimensions of the booth, associating the information relating to the dimensions of the booth and the weight information with a set of pre-established rules, and calculating the bundle package pricing based on the information relating to the dimensions of the booth, the weight information and the pre-established rules.

BRIEF DESCRIPTION OF THE DRAWINGS

FIG. 2 is a table of an exemplary set of pre-established rules for bundle weight ranges, bundle packaging and bundle pricing for the automated bundle package pricing system.

DETAILED DESCRIPTION

Figure 1:
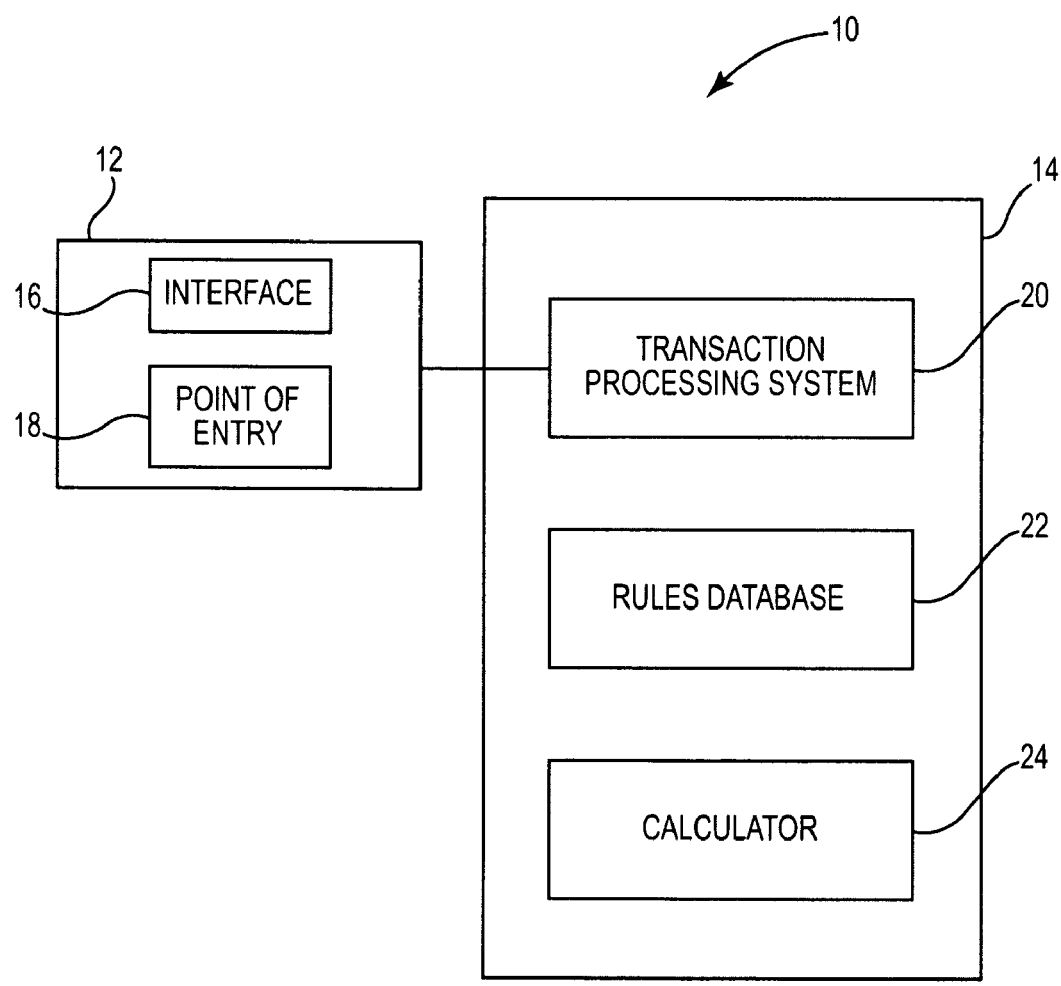
FIG. 1 is a block diagram of components of an automated bundle package pricing system according to an embodiment of the present invention.

FIG. 1 shows a block diagram of an automated bundle package pricing system 10 which provides a tool for a user to estimate the cost of setting up a booth at an event, such as, for example, at a trade show. The automated system 10 estimates a price for a bundle package including the core materials and services that are needed to set up a booth. Examples of such materials and services include, for example, carpeting, furniture, vacuuming, etc. The user first measures the dimensions of the booth and weighs the products expected to be positioned, or bundled, within the booth. Based on the dimensions of the booth and the total weight of the bundle, the pounds per square foot of the bundle is calculated. Using a set of pre-established rules relating to bundle packages and associated prices generally based on the pounds per square foot of the bundle, the automated system 10 provides a bundle package pricing. The bundle package pricing represents the cost of various products and services offered with the bundle package.

The automated system 10 includes a terminal 12 and a processor 14. The terminal 12 includes an interface 16 and a point of entry 18 and provides a location for the user to access and communicate with the processor 14. The interface 16 displays information to the user as well as prompts the user to enter data needed to perform the bundle package pricing transaction. Information that may be provided to the user include various exhibition options and costs. Information that may be requested from the user include the dimensions of the booth the user will be occupying and the weight of a bundle to be displayed within the booth. The dimensions of the booth include the length, height and width of the booth. The weight of the bundle includes the total weight of the materials, products and machinery required to set up the booth.

The user can submit data related to the requested information through the point of entry 18 when prompted by the interface 16. Various telecommunications devices can be easily adapted for use as a point of entry 18. In one embodiment, the terminal is a home or office computer where the interface 16 is a computer monitor and the point of entry 18 is a keyboard. Thus, the terminal 12 may be accessed from a customer's home or office.

The processor 14 is operatively connected to the terminal 12. As an example, the processor 14 and the terminal 12 can be remotely located with communication over a network such as the Internet. The processor 14 functions to receive, store and analyze the data in the automated system 10 through a transaction processing system 20, a rules database 22 and a calculator 24. The processor 14 interfaces with the terminal 12 and sends the information entered through the point of entry 18 to the transaction processing system 20. The transaction processing system 20 works in conjunction with the rules database 22 and the calculator 24 to determine the bundle package pricing.

In addition to receiving data from an external source, such as the user, the processor 14 also includes a rules database 22 which stores a plurality of pre-established rules. FIG. 2 shows a table of an exemplary pre-established set of rules for bundle weight ranges, bundle packaging and bundle pricing. The set of pre-established rules for classifying the data into a bundle weight range is based on the pounds per square foot of the bundle. In one embodiment, a first bundle weight range includes bundles weighing up to about 3 pounds per square foot, a second bundle weight range includes bundles weighing between about 3.1 and about 6 pounds per square foot, a third bundle weight range includes bundles weighing between about 6.1 and about 10 pounds per square foot, a fourth bundle weight range includes bundles weighing between about 10.1 and about 22 pounds per square foot, a fifth bundle weight range includes bundles weighing between about 22.1 and about 35 pounds per square foot, a sixth bundle weight range includes bundles weighing between about 35 and about 55 pounds per square foot, and a seventh bundle weight range includes bundles weighing at least about 55.1 pounds per square foot.

Depending on the bundle weight range the bundle falls within, the rules database also includes a set of pre-established rules for classifying the bundle into a bundle package. In one embodiment, the bundle is classified as a light bundle package, a medium bundle package or a heavy bundle package. Depending on whether the bundle is classified as a light bundle package, a medium bundle package or a heavy bundle package, different product and service options are offered to the user. In one embodiment, a bundle falls within the light bundle package classification if the bundle weighs up to about 6 pounds per square foot, a bundle falls within the medium bundle package classification if the bundle weighs between about 6.1 and about 22 pounds per square foot, and a bundle falls within the heavy bundle package classification if the bundle weighs at least about 22.1 pounds per square foot.

The rules database 22 also stores a pre-established set of rules for pricing the bundle. The pre-established prices associated with the bundle are based on the pounds per square foot of the bundle and increases as the pounds per square foot of the bundles increases. In one embodiment, the price per pound per square foot for a bundle weighing up to about 3 pounds per square feet is about $4.60, the price per pound per square foot for a bundle weighing between about 3.1 and about 6 pounds per square feet is about $5.60, the price per pound per square foot for a bundle weighing between about 6.1 and about 10 pounds per square feet is about $6.45, the price per pound per square foot for a bundle weighing between about 10.1 and about 22 pounds per square feet is about $7.30, the price per pound per square foot for a bundle weighing between about 22.1 and about 35 pounds per square feet is about $11.65, the price per pound per square foot for a bundle weighing between about 35.1 and about 55 pounds per square feet is about $15.35 and the price per pound per square foot for a bundle weighing about 55.1 pounds per square feet or over is about $23.25.

The transaction processing system 20 and the rules database 22 work in conjunction with the calculator 24 to determine the bundle package pricing of a bundle. The calculator 24 uses the information entered into the transaction processing system 20 by the user and the set of pre-established rules in the rules database 22 to calculate the pounds per square foot of a bundle and the bundle package price as described in further detail below.

The information stored in the processor 14 can be accessed and/or changed by an administrator when necessary or desired. For example, the administrator can change the information displayed on, or requested by, the automated system 10. The administrator can also change, add or delete rules in the rules database 22. For example, the pre-established rules for classifying the data into a bundle package and the corresponding pricing may be adjusted annually or as determined by the administrator. Any changes may be applied in real time or can be set to activate at a future time.

Figure 3:
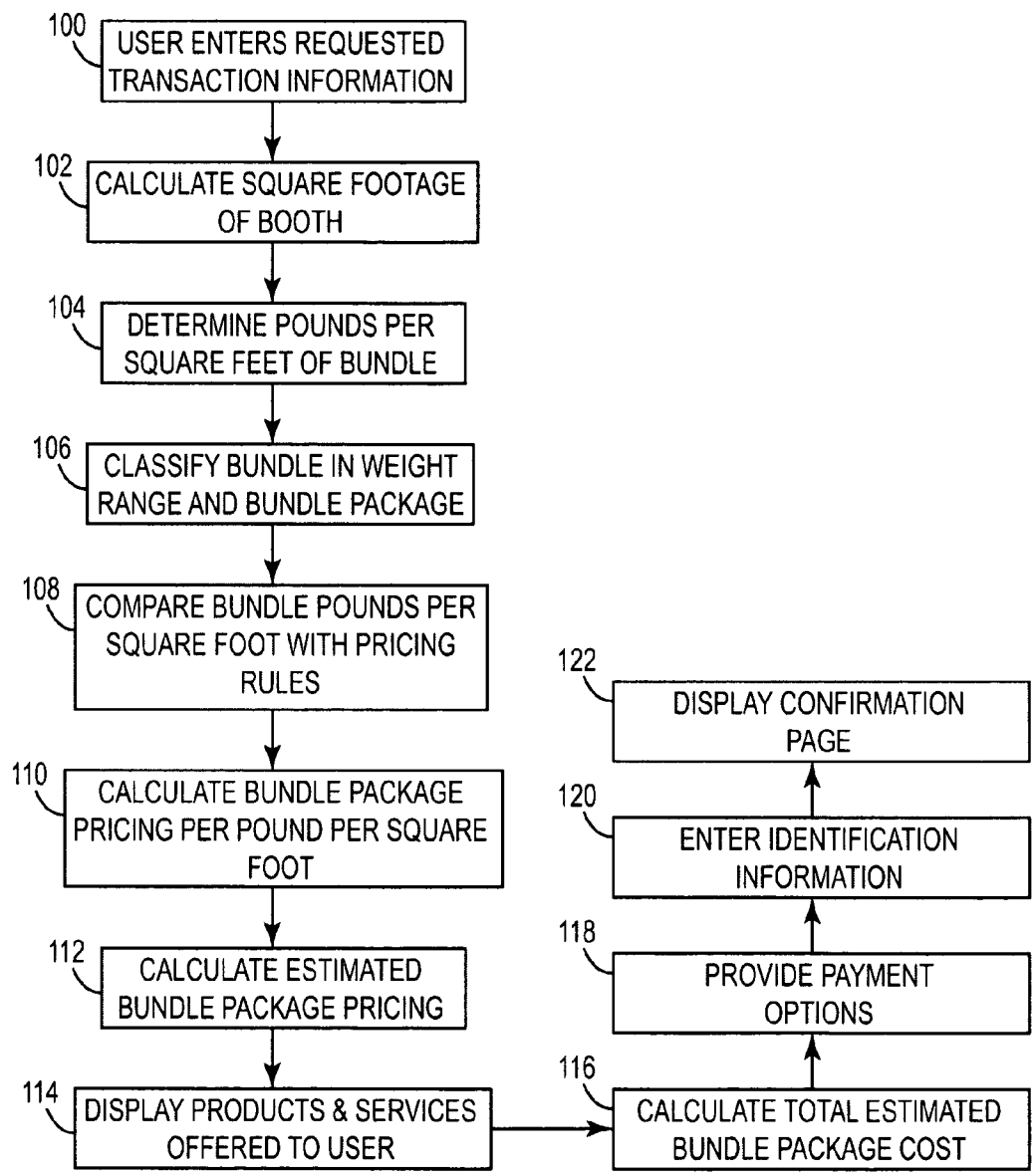
FIG. 3 is a flow diagram of a bundle package pricing transaction performed using the system shown in FIG. 1.

FIG. 3 is a flow chart describing the general operation of the automated system 10 during a bundle package pricing transaction using the components of the automated system 10. As shown in step 100, a user requesting a bundle package pricing transaction first enters the appropriate transaction information at the point of entry 18 (e.g. booth dimensions and bundle weight). The information is routed from the terminal 12 to the processor 14. The terminal 12 can be interfaced to the processor 14 through conventional data and information communication ports and networks, such as the Internet.

To determine the bundle package price for a particular booth and a particular bundle weight, the calculator 24 first uses the length, height and width dimensions of the booth entered by the user to calculate the total square footage of the booth (Step 102). As shown in Step 104, the bundle weight entered by the user is then divided by the total square feet of the booth calculated in Step 102 to determine the pounds per square foot of the bundle. Depending on the pounds per square foot of the bundle, the bundle is classified within a bundle weight range and as a light bundle package, a medium bundle package or a heavy bundle package (Step 106). In one embodiment, a bundle falls within the light bundle package classification if the bundle weighs up to about 6 pounds per square foot, a bundle falls within the medium bundle package classification if the bundle weighs between about 6.1 and about 22 pounds per square foot, and a bundle falls within the heavy bundle package classification if the bundle weighs at least about 22.1 pounds per square foot.

As shown in Step 108, once the bundle pounds per square foot has been calculated, the transaction processing system 20 then compares the bundle pounds per square foot with the pre-established rules relating to pricing. The calculator calculates the bundle package price per pound per square foot based on the bundle pound per square foot and the pricing associated with the calculated bundle pound per square foot (Step 110). The results are displayed to the user through the interface 16. As the pounds per square foot of the bundle increases, the pre-established pricing associated with the bundle also increases. In one embodiment, the price per pound per square foot for a bundle weighing up to about 3 pounds per square feet is about $4.60, the price per pound per square foot for a bundle weighing between about 3.1 and about 6 pounds per square feet is about $5.60, the price per pound per square foot for a bundle weighing between about 6.1 and about 10 pounds per square feet is about $6.45, the price per pound per square foot for a bundle weighing between about 10.1 and about 22 pounds per square feet is about $7.30, the price per pound per square foot for a bundle weighing between about 22.1 and about 35 pounds per square feet is about $11.65, the price per pound per square foot for a bundle weighing between about 35.1 and about 55 pounds per square feet is about $15.35 and the price per pound per square foot for a bundle weighing about 55 pounds per square feet or over is about $23.25.

Because the pre-established prices are based on a range of pounds per square foot, the user can increase the pounds per square foot of the bundle without increasing cost as long as the pounds per square foot of the bundle remains in the range given for each price. For example, using the exemplary pre-established price ranges given above, if a bundle initially weighed in at about 12 pounds per square foot, the user could increase the bundle weight by about 10 pounds before the bundle fell within the next bundle pounds per square foot price. Once the user has finalized the pounds per square foot of the bundle, the calculator 24 then calculates the estimated bundle package pricing by multiplying the square footage of the booth by the bundle price per pound per square foot (Step 112).

Various products and services are offered to the user depending on whether the bundle is classified as a light bundle package, a medium bundle package or a heavy bundle package. As shown in Step 114, the interface 16 displays the products and services offered to the user depending on the bundle package the bundle falls into and on the pre-established rules. In an embodiment where the bundle package is categorized as a light bundle package, exemplary products and services offered include drayage, custom-cut carpet with a plastic protective cover, nightly vacuuming, furniture from the classic furniture group and empty removal and storage. In addition to the products and services described for a light bundle package, exemplary products and services offered for a medium or heavy bundle package may also include rigging labor, fork lifts and cranes, and one time spotting. Upgrades on the offered products and services may also be available.

The transaction processing system 20 then displays a list of exhibition options based on the bundle package. The exhibition options are generally related to the core services related to furnishing the booth. For example, the exhibition options may be related to carpeting and furniture options. Exemplary options for carpeting may include selecting a carpeting upgrade, selecting carpeting color, adding a single layer of carpet padding, or adding a double layer of carpet padding. Exemplary options for furniture may include selecting furniture upgrades such as a particular type of chair, table or counter. In one embodiment, upon selection of an exhibition option, the calculator 24 automatically updates the estimated bundle package pricing based on the square footage previously calculated for the booth. Discounts may also be offered for the options, particularly for medium and heavy bundle packages.

If, for example, the bundle package is classified as a medium or heavy bundle package, the transaction processing system 20 may present additional options offered for those packages. In one embodiment, additional options may include show services, such as display labor, utilities, upgraded furniture, floral or photography. The costs associated with the additional show services are also displayed on the interface 16. In one embodiment, upon selection of an additional option, the calculator 24 automatically updates the estimated bundle package pricing based on the square footage previously calculated for the booth. Alternatively, once the user is finished selecting any additional options, the calculator 24 adds together the estimated bundle pricing, the cost of any additional options and the cost of any additional show services to calculate the total estimated bundle package cost (Step 116). The total estimated cost represents the total estimated budget for the user.

After the user has received and approved of the total estimated budget, the transaction processing system 20 provides the user with a plurality of payment options to confirm and pay for the order (Step 118). Exemplary payment options include, but are not limited to, payment by credit card, wire transfer or check. By paying for the bundle package through the automated system 10, the user pays for all of the options in a single payment. In addition, because most, if not all, of the exhibition furnishings and options are chosen at a single source, the booth set-up process is streamlined, minimizing the chances of forgetting a product or service.

As the user is entering payment information, the user may also be prompted to enter additional personal identification data (Step 120). For example, the user may be prompted to enter information such as the user's first name, last name, title, company, address, telephone or email address. By entering the identifying information, the administrator can associate an order with a particular user. The information also allows the administrator to identify the user and to verify the payment. Once the user has entered all of the information, the user submits the information to the transaction processing system 16 to be processed. Alternatively, the user may be prompted to enter their personal identification data at the beginning of the transaction, enabling the user to save their information at any point during the transaction. The user can then return to complete the transaction at a later time.

Upon submission of the requested information, the transaction processing system 20 creates a confirmation page that is displayed on the interface 16 (Step 122). The confirmation page includes information relating to the bundle package pricing transaction, such as a summary of the details. In one embodiment, the confirmation page will not display any credit card information for the safety of the user. The confirmation information may also be sent to the user's email address if provided. The data is then captured in a database in the processor 16 and submitted for processing. In one embodiment, an operator may be notified, such as by email, when a transaction has been completed and sent to the processor 16. In one embodiment, the operator may access information from the database related to a transaction upon being notified that the transaction has been completed.

While the automated system 10 provides an estimated bundle package pricing based on the dimensions of the booth and the weight of the bundle, the transaction processing system 20 and calculator 24 are also self-correcting. There may be various reasons that the bundle weight entered into the automated system 10 at the beginning of the transaction may not be accurate. The user may not know the exact weight of the bundle that the user will be using at the time the data is entered into the automated system 10. If the bundle weight is unknown, the user may have to estimate the weight of the bundle which may lead to inaccuracies in pricing the bundle package. In addition, the weight of the bundle may change from the time the user enters the bundle weight into the automated system 10 and the time when the event actually takes place. To account for these unknowns, the transaction processing system 20 and calculator 24 are self-correcting in that the final invoice and bundle price is finally determined by the actual weight and density of the bundle actually received at the booth.

The automated bundle package pricing system and method of the present invention estimates the price of a bundle package based on the dimensions of a booth and the weight of a bundle of materials, products and equipment expected to be located within the booth. Based on the dimensions of the booth and the total weight of the bundle, the pounds per square foot of the bundle is calculated. The pounds per square foot of the bundle is associated with a price per square foot from which the automated system provides a bundle price per pound per square foot and a resulting bundle package price. Additional options may also be added to the bundle package. A variety of payment options are also offered to the user to complete the transaction.

Although the present invention has been described with reference to preferred embodiments, those skilled in the art will recognize that changes can be made in form and detail without departing from the spirit and scope of the invention. Although described in connection with a bundle package pricing system, the invention can also be used in connection with other products provided by the operator of the system.

The following is claimed:

1. An automated method for calculating a bundle package pricing for a booth using a processor, the method comprising:
   receiving information relating to dimensions of the booth;
   receiving weight information relating to items and materials to be housed within the dimensions of the booth;
   using the processor to associate the information relating to the dimensions of the booth and the weight information with one of a plurality of bundle weight per area ranges established by a set of pre-established rules;
   calculating a weight per area of the booth, using the processor, by dividing the weight information by the dimensions of the booth; and
   calculating the bundle package pricing, using the processor, based on the weight per area of the booth and the set of pre-established rules, wherein the set of pre-established rules associate each of the plurality of weight per area ranges with at least one bundle package and a price.

2. The automated method of claim 1, wherein calculating the weight per area of the booth using the weight information and the dimensions of the booth comprises calculating a bundle pound per square foot.

3. The automated method of claim 2, wherein associating the information relating to the dimensions of the booth and the weight information with the set of pre-established rules further comprises determining the at least one bundle package based on the bundle pound per square foot.

4. The automated method of claim 2, wherein calculating the bundle package pricing comprises calculating a bundle price per square foot based on the bundle pound per square foot and the set of pre-established rules, and wherein calculating the bundle package pricing comprises using the information relating to the dimensions of the booth and the bundle price per square foot.

5. The automated method of claim 1, further comprising providing a plurality of payment options.

6. The automated method of claim 1, wherein the pre-established set of rules is based on the weight of the bundle and the area of the booth.

7. An automated system for pricing a bundle package based on a weight of a bundle and dimensions of a booth, the system comprising:
   an interface for requesting information and displaying information;
   a point of entry for submitting data related to the requested information, wherein the data represents the weight of the bundle and dimensions of the booth;
   a processor for receiving and controlling the data, wherein the processor comprises:
      a rules database for storing a pre-established set of rules for classifying data into one of a plurality of bundle weight per area ranges and for associating each of the plurality of bundle weight per area ranges with a price;
      a transaction processing system for storing the submitted data and for classifying the submitted data into one of the plurality of bundle weight per area ranges using the pre-established set of rules in the rules database and a weight per area of the bundle; and
      a calculator configured to determine an area of the booth from the dimensions of the booth and the weight per area of the bundle by dividing the weight of the bundle by the area of the booth, the calculator also being configured to determine a bundle package price based on the price associated with the bundle weight per area range into which the submitted data is classified and on the area of the booth;
   wherein the processor causes the interface to display requested information including dimensions of the booth and the weight of the bundle to be displayed within the booth.

8. The automated system of claim 1, wherein the rules database further includes a pre-established set of rules for classifying data into one of a plurality of bundle packages and the processor is configured to classify the submitted data into one of the plurality of bundle packages.

9. The automated system of claim 8, wherein the processor is configured to send to the interface a list of pre-selected product and service options related to furnishing the booth, wherein the product and service options are pre-selected based on the bundle package into which the submitted data is classified.

10. The automated system of claim 8, wherein each of the plurality of bundle packages includes at least two bundle weight per area ranges.

11. The automated system of claim 1, wherein the calculator is configured to determine a bundle pounds per square foot based on the dimensions of the booth and the weight of the bundle.

12. A processor for pricing a bundle package based on a weight of a bundle and on dimensions of a booth, the processor comprising:
   a rules database that stores a pre-established set of rules for classifying data into one of a plurality of bundle weight per area ranges and that associates each of the bundle weight per area ranges with a price;
   a transaction processing system for storing data and analyzing the pre-established set of rules in the rules database, wherein the data comprises the weight of the bundle and the dimensions of the booth; and
   a calculator for determining an area of the booth from the dimensions of the booth, for determining a weight per area of the bundle by dividing the weight of the bundle by the area of the booth, for classifying the data into one of the plurality of bundle weight per area ranges based on the pre-established rules and the weight per area of the bundle, and for determining a bundle package price based on the area of the booth and on the price of the weight per area range into which the data is classified.

13. The processor of claim 12 further configured to provide a list of product and service options related to furnishing the booth.

14. The automated system of claim 13, wherein the list of product and service options are pre-associated with the bundle package.

15. The processor of claim 12, wherein the calculator is configured to determine a bundle pounds per square foot based on the dimensions of the booth and the weight of the bundle.

16. A processor-implemented automated process for processing data related to bundle package pricing, the process comprising:
   requesting booth dimension information from a user;
   requesting weight information of material to be shipped to the booth;
   determining an area of the booth based on the booth dimension information;
   determining a weight per area of the booth, using a processor, by dividing the weight information of the material to be shipped to the booth by the area of the booth;
   classifying the weight per area of the booth, using the processor, into one of a plurality of bundle weight per area ranges according to a set of pre-established rules that establish the plurality of bundle weight per area ranges;
   determining a bundle package, using the processor, based on the bundle weight per area range into which the weight per area of the booth is classified using the set of pre-established rules that associate at least one bundle package with each of the plurality of bundle weight per area ranges; and
   associating a price with the bundle package.

17. The automated process of claim 16, wherein determining the weight per area of the booth comprises calculating a bundle pound per square foot based on the booth dimension information and the weight information and wherein associating the price with the bundle package comprises calculating the price based on the pre-established rules that associate at least one price with each of the plurality of bundle weight per area ranges and on the area of the booth.

18. The automated process of claim 17, wherein associating the price with the bundle package comprises calculating a bundle package price based on the price per square foot and the pre-established rules that associate the price with the bundle package.

19. The automated process of claim 16, further comprising sending to the user a list of pre-selected product and service options related to furnishing the booth, wherein the product and service options are pre-selected based on the bundle package.

* * * * *